(12) United States Patent
Cho et al.

(10) Patent No.: US 9,933,047 B1
(45) Date of Patent: Apr. 3, 2018

(54) PLANETARY GEAR TRAIN OF AUTOMATIC TRANSMISSION FOR VEHICLES

(71) Applicant: HYUNDAI MOTOR COMPANY, Seoul (KR)

(72) Inventors: Wonmin Cho, Hwaseong-si (KR); Seong Wook Hwang, Gunpo-si (KR); Hyun Sik Kwon, Seoul (KR); Ki Tae Kim, Incheon (KR); Jae Chang Kook, Hwaseong-si (KR); Seongwook Ji, Gunpo-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/370,238

(22) Filed: Dec. 6, 2016

(30) Foreign Application Priority Data

Sep. 12, 2016 (KR) .................. 10-2016-0117353

(51) Int. Cl.
*F16H 3/66* (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01)

(58) Field of Classification Search
None
See application file for complete search history.

(56) References Cited

U.S. PATENT DOCUMENTS

| 8,128,527 B2 | 3/2012 | Hart et al. | |
| 9,005,073 B1 * | 4/2015 | Noh | F16H 3/66 475/282 |
| 2011/0009229 A1 * | 1/2011 | Bauknecht | F16H 3/66 475/275 |

FOREIGN PATENT DOCUMENTS

KR   10-2016-0061488   6/2016

* cited by examiner

*Primary Examiner* — Erin D Bishop
(74) *Attorney, Agent, or Firm* — Brinks Gilson & Lione

(57) ABSTRACT

The present disclosure provides a planetary gear train of an automatic transmission for a vehicle having advantages of improving power transfer performance and fuel efficiency by implementing ten forward speeds and one reverse speed. The planetary gear train includes: first, second, third, and fourth planetary gear sets disposed on the same shaft line; an input shaft; an output shaft; eight shafts connected to the respective rotational elements of the first, second, third, and fourth planetary gear sets; four clutches and two brakes which are control elements; and a transmission housing H. With this arrangement, rotation power from an engine which is input from the input shaft is shifted by a mutual complementing operation between the first, second, third, and fourth planetary gear sets, and is then output through the output shaft.

10 Claims, 2 Drawing Sheets

FIG. 2

Figure 1:
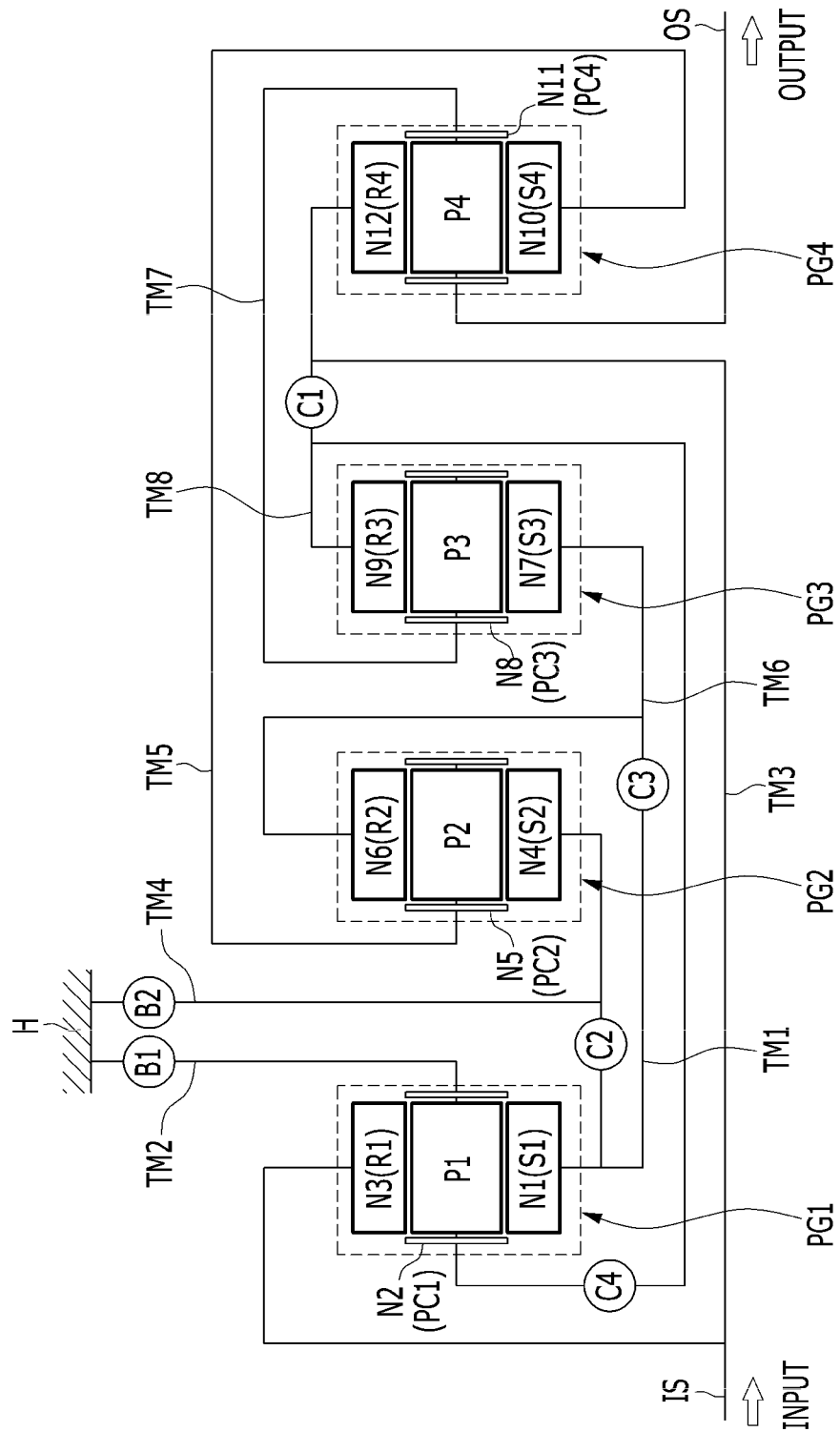

| SHIFT-STAGE | CONTORL ELEMENT ||||| GEAR RATIO |
|---|---|---|---|---|---|---|
| | C1 | C2 | C3 | C4 | B1 | B2 | |
| D1 | ● | | ● | | | | 5.900 |
| D2 | | ● | ● | | ● | | 3.333 |
| D3 | | | ● | | ● | ● | 2.132 |
| D4 | | ● | ● | | | ● | 1.400 |
| D5 | ● | | ● | | | ● | 1.303 |
| D6 | | | ● | ● | | ● | 1.193 |
| D7 | | ● | ● | ● | | | 1.000 |
| D8 | | ● | | ● | | ● | 0.965 |
| D9 | | | | ● | ● | | 0.919 |
| D10 | | | | ● | ● | ● | 0.702 |
| REV | | | ● | ● | ● | | -2.034 |

PLANETARY GEAR TRAIN OF AUTOMATIC TRANSMISSION FOR VEHICLES

CROSS-REFERENCE TO RELATED APPLICATION

This application claims priority to and the benefit of Korean Patent Application No. 10-2016-0117353, filed on Sep. 12, 2016, the entire contents of which are incorporated herein by reference.

FIELD

The present disclosure relates to a planetary gear train of an automatic transmission for vehicles, and more particularly, to a planetary gear train of an automatic transmission for vehicles capable of improving power transfer performance and fuel efficiency.

BACKGROUND

The statements in this section merely provide background information related to the present disclosure and may not constitute prior art.

In an automatic transmission field, a research for an increase of the number of shift-stages is generally performed for a technology for improving fuel efficiency of a vehicle and maximizing drivability, and a recent increase in oil price causes unlimited competition for the improvement of the fuel efficiency.

As a result, in the case of an engine, a research capable of reducing weight and improving fuel efficiency by downsizing the engine has been conducted, and in the case of an automatic transmission, a research capable of simultaneously securing drivability and fuel efficiency competitiveness by the increase of the number of shift-stages of the automatic transmission has been conducted.

However, as the number of shift-stages of the automatic transmission is increased, the number of internal parts, particularly, the number of planetary gear sets is increased, which increases an entire length of the transmission, thereby causing mountability, production cost, weight, transfer efficiency, etc., to be deteriorated.

In this aspect, the automatic transmission is configured to implement a shift of 8-speed or more and is mounted in the vehicle, and a research and development into a planetary gear train capable of implementing a shift-stage of 8-speed or more has been continuously desired.

However, a general automatic transmission of 8-speed or more generally includes 3 to 4 planetary gear sets and 5 to 7 control elements (friction elements), and in this case, since the entire length is increased, mountability may be deteriorated.

Accordingly, in order to increase the number of shift-stages of the automatic transmission, a double row structure in which the planetary gear set is disposed on the planetary gear set is recently adopted, or a dog clutch instead of a wet control element is recently applied, but in this case, we have discovered that there is a problem that an applicable structure is limited, and deterioration of shift sensitivity is involved due to the application of the dog clutch.

The above information disclosed in this Background section is only for enhancement of understanding of the background of the present disclosure and therefore it may contain information that does not form the prior art that is already known to a person of ordinary skill in the art.

SUMMARY

The present disclosure provides a planetary gear train of an automatic transmission for vehicles having advantages of improving power transfer performance and fuel efficiency according to an increase of shift-stages by implementing a shift-stage of an advance 10-speed and a reverse 1-speed by reduced components and improving drive silence of a vehicle by using an operating point in a low revolution per minute (RPM) region of an engine.

An example form of the present disclosure provides a planetary gear train of an automatic transmission for vehicles including: an input shaft configured to receive power from an engine; an output shaft configured to output shifted power; a first planetary gear set including first, second, and third rotation elements; a second planetary gear set including fourth, fifth, and sixth rotation elements; a third planetary gear set including seventh, eighth, and ninth rotation elements; a fourth planetary gear set including tenth, eleventh, and twelfth rotation elements; a first shaft configured to be connected to the first rotation element; a second shaft configured to be connected to the second rotation element; a third shaft configured to be connected to the third rotation element, the twelfth rotation element and the input shaft; a fourth shaft configured to be connected to the fourth rotation element and selectively connected to the first shaft; a fifth shaft configured to be connected to the fifth element and the tenth rotation element; a sixth shaft configured to be connected to the sixth rotation element and the seventh rotation element, and selectively connected to the first shaft; a seventh shaft configured to be connected to the eighth rotation element, the eleventh rotation element and the output shaft; and an eighth shaft configured to be connected to the ninth rotation element and selectively connected to the second shaft and the third shaft, respectively.

The second shaft and the fourth shaft may be each selectively connected to a transmission housing.

The first, second, and third rotation elements of the first planetary gear set may be a first sun gear, a first planetary carrier, and a first ring gear, respectively, and the fourth, fifth, and sixth rotation elements of the second planetary gear set may be a second sun gear, a second planetary carrier, and a second ring gear, respectively. The seventh, eighth, and ninth rotation elements of the third planetary gear set may be a third sun gear, a third planetary carrier, and a third ring gear, respectively, and the tenth, eleventh, and twelfth rotation elements of the fourth planetary gear set may be a fourth sun gear, a fourth planetary carrier, and a fourth ring gear, respectively.

The first, second, third, and fourth planetary gear sets may be disposed in order of the first, second, third, and fourth planetary gear sets from an engine side.

The planetary gear train may further include: a first clutch configured to selectively connect the third shaft and the eighth shaft to each other; a second clutch configured to selectively connect the first shaft and the fourth shaft to each other; a third clutch configured to selectively connect the first shaft and the sixth shaft to each other; a fourth clutch configured to selectively connect the second shaft and the eighth shaft to each other; a first brake configured to selectively connect the second shaft and the transmission housing to each other; and a second brake configured to selectively connect the fourth shaft and the transmission housing to each other.

In one form of the present disclosure, the planetary gear train may implement the shift-stage of advance ten speeds and one reverse speed by combining four planetary gear sets formed of simple planetary gear sets with six control elements.

Further, the planetary gear train may implement the shift-stage suitable for the revolution per minute (RPM) of the engine by increasing the number of shift-stages of the automatic transmission, and may particularly improve drive silence of the vehicle by using the operating point in the low RPM region of the engine.

Further, the planetary gear train may increase driving efficiency of the engine by increasing the number of shift-stages of the automatic transmission, and improve power delivery performance and fuel efficiency.

Other effects that may be obtained or predicted from the exemplary forms of the present disclosure will be explicitly or implicitly disclosed in the following detailed description.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a configuration diagram of a planetary gear train in one exemplary form of the present disclosure; and FIG. 2 is an operation table for each of shift-stages of a control element used for the planetary gear train in one exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings.

In the following detailed description, classifying names of the configurations into first, second, and the like, is to classify the configurations because the configurations have the same relationship, and the present disclosure is not necessarily limited to the above-mentioned order in the following detailed description.

FIG. 1 is a configuration diagram of a planetary gear train in one exemplary form of the present disclosure.

Referring to FIG. 1, the planetary gear train includes: first, second, third, and fourth planetary gear sets PG1, PG2, PG3, and PG4 disposed on the same shaft line; an input shaft IS; an output shaft OS; eight shafts TM1 to TM8 connected to the respective rotational elements of the first, second, third, and fourth planetary gear sets PG1, PG2, PG3, and PG4; four clutches C1 to C4 and two brakes B1 and B2 which are control elements; and a transmission housing H.

In addition, rotation power from an engine which is input from the input shaft IS is shifted by a mutual complementing operation between the first, second, third, and fourth planetary gear sets PG1, PG2, PG3, and PG4, and is then output through the output shaft OS.

Here, the respective planetary gear sets are disposed in order of the first, second, third, and fourth planetary gear sets PG1, PG2, PG3, and PG4 from an engine side.

The input shaft IS is an input member, and rotation power from a crack shaft of the engine may be input to the input shaft after a torque thereof is converted by a torque converter.

The output shaft OS is an output member, and is disposed on the same shaft line as the input shaft IS to transfer shifted driving force to a driving shaft through a differential apparatus (not shown).

The first planetary gear set PG1, which is a single pinion planetary gear set, includes: a first sun gear S1 which is a first rotation element N1; a first planetary carrier PC1 which is a second rotation element N2, rotatably and revolvably supporting a plurality of first pinion gears P1 externally engaged with the first sun gear S1; and a first ring gear R1 which is a third rotation element N3, internally engaged with the plurality of first pinion gears P1 to be power-connected to the first sun gear S1.

The second planetary gear set PG2, which is a single pinion planetary gear set, includes: a second sun gear S2 which is a fourth rotation element N4; a second planetary carrier PC1 which is a fifth rotation element N5, rotatably and revolvably supporting a plurality of second pinion gears P2 externally engaged with the second sun gear S2; and a second ring gear R2 which is a sixth rotation element N6, internally engaged with the plurality of second pinion gears P2 to be power-connected to the second sun gear S2.

The third planetary gear set PG3, which is a single pinion planetary gear set, includes: a third sun gear S3 which is a seventh rotation element N7; a third planetary carrier PC3 which is an eighth rotation element N8, rotatably and revolvably supporting a plurality of third pinion gears P3 externally engaged with the third sun gear S3; and a third ring gear R3 which is a ninth rotation element N9, internally engaged with the plurality of third pinion gears P3 to be power-connected to the third sun gear S3.

The fourth planetary gear set PG4, which is a single pinion planetary gear set, includes: a fourth sun gear S4 which is a tenth rotation element N10; a fourth planetary carrier PC4 which is an eleventh rotation element N11, rotatably and revolvably supporting a plurality of fourth pinion gears P4 externally engaged with the fourth sun gear S4; and a fourth ring gear R4 which is a twelfth rotation element N12, internally engaged with the plurality of fourth pinion gears P4 to be power-connected to the fourth sun gear S4.

Here, in the first, second, third, and fourth planetary gear sets PG1, PG2, PG3, and PG4, the third rotation element N3 is directly connected to the twelfth rotation element N12, the fifth rotation element N5 is directly connected to the tenth rotation element N10, the sixth rotation element N6 is directly connected to the seventh rotation element N7, and the eighth rotation element N8 is directly connected to the eleventh rotation element N11, such that the first, second, third, and fourth planetary gear sets PG1, PG2, PG3, and PG4 are operated through the eight shafts TM1 to TM8.

Configurations of the eight shafts TM1 to TM8 will be described in detail below.

However, the eight shafts TM1 to TM8 may be rotation members transferring power while being rotated together with rotation elements of the planetary gear sets PG1, PG2, PG3, and PG4, directly or selectively, and may be rotation members selectively connecting the rotation elements to the transmission housing H, or be fixed members directly connecting the rotation elements to the transmission housing H to be fixed to the transmission housing H.

The first shaft TM1 is directly connected to the first rotation element N1 (the first sun gear S1).

The second shaft TM2 is directly connected to the second rotation element N2 (the first planetary carrier PC1), and is selectively connected to the transmission housing H to thereby be operated as a selective fixed element.

The third shaft TM3 is directly connected to the third rotation element N3 (the first ring gear R2) and the twelfth rotation element N12 (the fourth ring gear R4), and is directly connected to the input shaft IS to thereby be always operated as an input element.

The fourth shaft TM4 is directly connected to the fourth rotation element N4 (the second sun gear S2), is selectively connected to the first shaft TM1, and is selectively connected to the transmission housing H to thereby be operated as a selective fixed element.

The fifth shaft TM5 is directly connected to the fifth rotation element N5 (the second planetary carrier PC2) and the tenth rotation element N10 (the fourth sun gear S4).

The sixth shaft TM6 is directly connected to the sixth rotation element N6 (the second ring gear R2) and the seventh rotation element N7 (the third sun gear S3), and is selectively connected to the first shaft TM1.

The seventh shaft TM7 is directly connected to the eighth rotation element N8 (the third planetary carrier PC3) and the eleventh rotation element N11 (the fourth planetary carrier PC4), and is directly connected to the output shaft OS to thereby be always operated as an output element.

The eighth shaft TM8 is directly connected to the ninth rotation element N9 (the third ring gear R3), and is selectively connected to the second shaft TM2 and the third shaft TM3, respectively.

In addition, four clutches C1 to C4 are disposed at portions of shafts including the input shaft IS and the output shaft OS selectively connected to each other, among the eight shafts TM1 to TM8.

In addition, two brakes B1 and B2 are disposed at portions of shafts selectively connected to the transmission housing H, among the eight shafts TM1 to TM8.

Disposed positions of the four clutches C1 to C4, and the two brakes B1 and B2 will be described below.

A first clutch C1 is disposed between the third shaft TM3 and the eighth shaft TM8 to thereby selectively connect the third shaft TM3 and the eighth shaft TM8 to each other to transfer power.

A second clutch C2 is disposed between the first shaft TM1 and the fourth shaft TM4 to thereby selectively connect the first shaft TM1 and the fourth shaft TM4 to each other to transfer power.

A third clutch C3 is disposed between the first shaft TM1 and the sixth shaft TM6 to thereby selectively connect the first shaft TM1 and the sixth shaft TM6 to each other to transfer power.

A fourth clutch C4 is disposed between the second shaft TM2 and the eighth shaft TM8 to thereby selectively connect the second shaft TM2 and the eighth shaft TM8 to each other to transfer power.

A first brake B1 is disposed between the second shaft TM2 and the transmission housing H to thereby selectively connect the second shaft TM2 to the transmission housing H to be fixed to the transmission housing H.

A second brake B2 is disposed between the fourth shaft TM4 and the transmission housing H to thereby selectively connect the fourth shaft TM4 to the transmission housing H to be fixed to the transmission housing H.

In the above-mentioned description, the respective control elements including the first, second, third, and fourth clutches C1, C2, C3, and C4, and the first and second brakes B1 and B2, which are hydraulic friction coupling units operated by hydraulic pressure supplied from a hydraulic controller, mainly uses wet multi-plate hydraulic friction coupling units, but may include coupling units which may be operated in response to an electrical signal supplied from an electronic control apparatus such as a dog clutch, an electronic clutch, a differential clutch, or the like.

FIG. 2 is an operation table for each of shift-stages of a control element which is used for the planetary gear train in one exemplary form of the present disclosure.

Referring to FIG. 2, in the respective shift-stages of the planetary gear train, while three control elements among the clutches (i.e., the first, second, third, and fourth clutches C1 to C4) and the brakes (i.e., first and second brakes B1 and B2), which are the control elements, are operated, shifts of a reverse 1-speed and forward 10 speeds (i.e., advance 10 speeds D1 to D10) are performed. A shift operation will be described below.

In an advance 1-speed shift stage (D1), the first and third clutches C1 and C3, and the first brake B1 are simultaneously operated.

Accordingly, in a state in which the third shaft TM3 is connected to the eighth shaft TM8 by an operation of the first clutch C1, and the first shaft TM1 is connected to the sixth shaft TM6 by an operation of the third clutch C3, rotation power of the input shaft IS is input to the third shaft TM3.

In addition, the shift-stage is shifted to an advance 1-speed by a mutual compensating operation of the respective shafts while the second shaft TM2 is operated as the fixed element by an operation of the first brake B1, such that the rotation power is output through the output shaft OS connected to the seventh shaft TM7.

In an advance 2-speed shift stage (D2), the second and third clutches C2 and C3, and the first brake B1 are simultaneously operated.

Accordingly, in a state in which the first shaft TM1 is connected to the fourth shaft TM4 by an operation of the second clutch C2, and the first shaft TM1 is connected to the sixth shaft TM6 by the operation of the third clutch C3, rotation power of the input shaft IS is input to the third shaft TM3.

In addition, the shift-stage is shifted to an advance 2-speed by a mutual compensating operation of the respective shafts while the second shaft TM2 is operated as the fixed element by an operation of the first brake B1, such that the rotation power is output through the output shaft OS connected to the seventh shaft TM7.

In an advance 3-speed shift stage (D3), the third clutch C3, and the first and second brakes B1 and B2 are simultaneously operated.

Accordingly, in a state in which the first shaft TM1 is connected to the sixth shaft TM6 by the operation of the third clutch C3, rotation power of the input shaft IS is input to the third shaft TM3.

In addition, the shift-stage is shifted to an advance 3-speed by a mutual compensating operation of the respective shafts while the second shaft TM2 and the fourth shaft TM4 are operated as the fixed elements by operations of the first and second brakes B1 and B2, such that the rotation power is output through the output shaft OS connected to the seventh shaft TM7.

In an advance 4-speed shift stage (D4), the second and third clutches C2 and C3, and the second brake B2 are simultaneously operated.

Accordingly, in a state in which the first shaft TM1 is connected to the fourth shaft TM4 by an operation of the second clutch C2, and the first shaft TM1 is connected to the sixth shaft TM6 by the operation of the third clutch C3, rotation power of the input shaft IS is input to the third shaft TM3.

In addition, the shift-stage is shifted to an advance 4-speed by a mutual compensating operation of the respective shafts while the fourth shaft TM4 is operated as the fixed element by an operation of the second brake B2, such that the rotation power is output through the output shaft OS connected to the seventh shaft TM7.

In an advance 5-speed shift stage (D5), the first and third clutches C1 and C3, and the second brake B2 are simultaneously operated.

Accordingly, in a state in which the third shaft TM3 is connected to the eighth shaft TM8 by an operation of the first clutch C1, and the first shaft TM1 is connected to the sixth shaft TM6 by an operation of the third clutch C3, rotation power of the input shaft IS is input to the third shaft TM3.

In addition, the shift-stage is shifted to an advance 5-speed by a mutual compensating operation of the respective shafts while the fourth shaft TM4 is operated as the fixed element by an operation of the second brake B2, such that the rotation power is output through the output shaft OS connected to the seventh shaft TM7.

In an advance 6-speed shift stage (D6), the third and fourth clutches C3 and C4, and the second brake B2 are simultaneously operated.

Accordingly, in a state in which the first shaft TM1 is connected to the sixth shaft SM6 by an operation of the third clutch C3, and the second shaft TM2 is connected to the eighth shaft TM8 by an operation of the fourth clutch C4, rotation power of the input shaft IS is input to the third shaft TM3.

In addition, the shift-stage is shifted to an advance 6-speed by a mutual compensating operation of the respective shafts while the fourth shaft TM4 is operated as the fixed element by an operation of the second brake B2, such that the rotation power is output through the output shaft OS connected to the seventh shaft TM7.

In an advance 7-speed shift stage (D7), the second, third, and fourth clutches C2, C3, and C4 are simultaneously operated.

Accordingly, in a state in which the first shaft TM1 is connected to the fourth shaft SM4 by an operation of the second clutch C2, the first shaft TM1 is connected to the sixth shaft TM6 by an operation of the third clutch C3, and the second shaft TM2 is connected to the eighth shaft TM8 by an operation of the fourth clutch C4, rotation power of the input shaft IS is input to the third shaft TM3.

Therefore, the shift-stage is shifted to an advance 7-speed that outputs an input as it is while the first, second, third, and fourth planetary gear sets PG1, PG2, PG3, and PG4 are integrally rotated, such that the rotation power is output through the output shaft OS connected to the seventh shaft TM7.

In an advance 8-speed shift stage (D8), the second and fourth clutches C2 and C4, and the second brake B2 are simultaneously operated.

Accordingly, in a state in which the first shaft TM1 is connected to the fourth shaft TM4 by an operation of the second clutch C2, and the second shaft TM2 is connected to the eighth shaft TM8 by an operation of the fourth clutch C4, rotation power of the input shaft IS is input to the third shaft TM3.

In addition, the shift-stage is shifted to an advance 8-speed, which is an over-drive state, by a mutual compensating operation of the respective shafts while the fourth shaft TM4 is operated as the fixed element by an operation of the second brake B2, such that the rotation power is output through the output shaft OS connected to the seventh shaft TM7.

In an advance 9-speed shift stage (D9), the second and fourth clutches C2 and C4 and the first brake B1 are simultaneously operated.

Accordingly, in a state in which the first shaft TM1 is connected to the fourth shaft TM4 by an operation of the second clutch C2, and the second shaft TM2 is connected to the eighth shaft TM8 by an operation of the fourth clutch C4, rotation power of the input shaft IS is input to the third shaft TM3.

In addition, the shift-stage is shifted to an advance 9-speed, which is an over-drive state, by a mutual compensating operation of the respective shafts while the second shaft TM2 is operated as the fixed element by an operation of the first brake B1, such that the rotation power is output through the output shaft OS connected to the seventh shaft TM7.

In an advance 10-speed shift stage (D10), the fourth clutch C4, and the first and second brakes B1 and B2 are simultaneously operated.

Accordingly, in a state in which the second shaft TM2 is connected to the eighth shaft TM8 by the operation of the fourth clutch C4, rotation power of the input shaft IS is input to the third shaft TM3.

In addition, the shift-stage is shifted to an advance 10-speed, which is the highest shift-stage, by a mutual compensating operation of the respective shafts while the second shaft TM2 and the fourth shaft TM4 are operated as the fixed elements by operations of the first and second brakes B1 and B2, such that the rotation power is output through the output shaft OS connected to the seventh shaft TM7.

In a reverse shift-stage REV, the third and fourth clutches C3 and C4, and the first brake B1 are simultaneously operated.

Accordingly, in a state in which the first shaft TM1 is connected to the sixth shaft SM6 by an operation of the third clutch C3, and the second shaft TM2 is connected to the eighth shaft TM8 by an operation of the fourth clutch C4, rotation power of the input shaft IS is input to the third shaft TM3.

In addition, the shift-stage is shifted to a reverse 1-speed by a mutual compensating operation of the respective shafts while the second shaft TM2 is operated as the fixed element by an operation of the first brake B1, such that the reverse rotation power is output through the output shaft OS connected to the seventh shaft TM7.

As described above, the planetary gear train may implement a shift stage of the advance 10 speeds and the reverse 1 speed with the fourth planetary gear sets PG1, PG2, PG3, and PG4 by the operation control of the fourth clutches C1, C2, C3, and C4, and the two brakes B1 and B2.

Further, the planetary gear train may implement the shift-stage suitable for the revolution per minute (RPM) of the engine by increasing the number of shift-stages of the automatic transmission, and may particularly improve drive silence of the vehicle by using the operating point in the low RPM region of the engine.

Further, the planetary gear train of the present disclosure may increase driving efficiency of the engine by increasing the number of shift-stages of the automatic transmission, and improve power delivery performance and fuel efficiency.

Hereinabove, although the present disclosure has been described in detail with reference to the exemplary form of the present disclosure, it is to be understood by those skilled in the art that the present disclosure may be variously modified and altered without departing from the scope and spirit of the present disclosure.

DESCRIPTION OF SYMBOLS

B1, B2 . . . first, second brakes
C1, C2, C3, C4 . . . first, second, third, fourth clutches
PG1, PG2, PG3, PG4 . . . first, second, third, fourth planetary gear sets
S1, S2, S3, S4 . . . first, second, third, fourth sun gears
PC1, PC2, PC3, PC4 . . . first, second, third, fourth planetary carriers
R1, R2, R3, R4 . . . first, second, third, fourth ring gears
IS . . . input shaft
OS . . . output shaft
TM1, TM2, TM3, TM4, TM5, TM6, TM7, TM8 . . . first, second, third, fourth, fifth, sixth, seventh, eighth shafts

What is claimed is:

1. A planetary gear train of an automatic transmission for vehicles, the planetary gear train comprising:
an input shaft configured to receive power from an engine;
an output shaft configured to output shifted power;
a first planetary gear set including first, second, and third rotation elements, the first, second, and third rotation elements being rotatable with different rotation speeds from each other;
a second planetary gear set including fourth, fifth, and sixth rotation elements, the fourth, fifth, and sixth rotation elements being rotatable with different rotation speeds from each other;
a third planetary gear set including seventh, eighth, and ninth rotation elements, the seventh, eighth, and ninth rotation elements being rotatable with different rotation speeds from each other;
a fourth planetary gear set including tenth, eleventh, and twelfth rotation elements, the tenth, eleventh, and twelfth rotation elements being rotatable with different rotation speeds from each other;
a first shaft configured to be fixedly connected to the first rotation element;
a second shaft configured to be fixedly connected to the second rotation element;
a third shaft configured to be fixedly connected to the third rotation element, the twelfth rotation element and the input shaft;
a fourth shaft configured to be fixedly connected to the fourth rotation element, and configured to be selectively connected to the first shaft;
a fifth shaft configured to be fixedly connected to the fifth rotation element and the tenth rotation element;
a sixth shaft configured to be fixedly connected to the sixth rotation element and the seventh rotation element, and configured to be selectively connected to the first shaft;
a seventh shaft configured to be fixedly connected to the eighth rotation element, the eleventh rotation element and the output shaft; and
an eighth shaft configured to be fixedly connected to the ninth rotation element, and configured to be selectively connected to the second shaft and the third shaft, respectively.

2. The planetary gear train of claim 1, wherein
the second shaft and the fourth shaft are each selectively connected to a transmission housing.

3. The planetary gear train of claim 2, further comprising:
a first clutch configured to selectively connect the third shaft and the eighth shaft to each other;
a second clutch configured to selectively connect the first shaft and the fourth shaft to each other;
a third clutch configured to selectively connect the first shaft and the sixth shaft to each other;
a fourth clutch configured to selectively connect the second shaft and the eighth shaft to each other;
a first brake configured to selectively connect the second shaft and the transmission housing to each other; and
a second brake configured to selectively connect the fourth shaft and the transmission housing to each other.

4. The planetary gear train of claim 1, wherein
the first, second, and third rotation elements of the first planetary gear set are a first sun gear, a first planetary carrier, and a first ring gear, respectively,
the fourth, fifth, and sixth rotation elements of the second planetary gear set are a second sun gear, a second planetary carrier, and a second ring gear, respectively,
the seventh, eighth, and ninth rotation elements of the third planetary gear set are a third sun gear, a third planetary carrier, and a third ring gear, respectively, and
the tenth, eleventh, and twelfth rotation elements of the fourth planetary gear set are a fourth sun gear, a fourth planetary carrier, and a fourth ring gear, respectively.

5. The planetary gear train of claim 1, wherein the first, second, third, and fourth planetary gear sets are disposed in order of the first, second, third, and fourth planetary gear sets from an engine side.

6. A planetary gear train of an automatic transmission for vehicles, the planetary gear train comprising:
an input shaft configured to receive power from an engine;
an output shaft configured to output shifted power;
a first planetary gear set including first, second, and third rotation elements, the first, second, and third rotation elements being rotatable with different rotation speeds from each other;
a second planetary gear set including fourth, fifth, and sixth rotation elements, the fourth, fifth, and sixth rotation elements being rotatable with different rotation speeds from each other;
a third planetary gear set including seventh, eighth, and ninth rotation elements, the seventh, eighth, and ninth rotation elements being rotatable with different rotation speeds from each other; and
a fourth planetary gear set including tenth, eleventh, and twelfth rotation elements, the tenth, eleventh, and twelfth rotation elements being rotatable with different rotation speeds from each other,
wherein the input shaft is configured to be fixedly connected to the third rotation element,
the output shaft is configured to be fixedly connected to the eleventh rotation element,
the third rotation element is configured to be fixedly connected to the twelfth rotation element,
the fifth rotation element is configured to be fixedly connected to the tenth rotation element, the sixth rotation element is configured to be fixedly connected to the seventh rotation element, the eighth rotation element is configured to be fixedly connected to the eleventh rotation element, the first rotation element is configured to be selectively connected to the fourth and sixth rotation elements, respectively, and the ninth rotation element is configured to be selectively connected to the second and twelfth rotation elements, respectively.

7. The planetary gear train of claim 6, wherein the second rotation element and the fourth rotation element are each selectively connected to a transmission housing.

8. The planetary gear train of claim 7, further comprising:

a first clutch configured to selectively connect the ninth rotation element and the twelfth rotation element to each other;

a second clutch configured to selectively connect the first rotation element and the fourth rotation element to each other;

a third clutch configured to selectively connect the first rotation element and the sixth rotation element to each other;

a fourth clutch configured to selectively connect the second rotation element and the ninth rotation element to each other;

a first brake configured to selectively connect the second rotation element and the transmission housing to each other; and a second brake configured to selectively connect the fourth rotation element and the transmission housing to each other.

9. The planetary gear train of claim 6, wherein the first, second, and third rotation elements of the first planetary gear set are a first sun gear, a first planetary carrier, and a first ring gear, respectively, the fourth, fifth, and sixth rotation elements of the second planetary gear set are a second sun gear, a second planetary carrier, and a second ring gear, respectively, the seventh, eighth, and ninth rotation elements of the third planetary gear set are a third sun gear, a third planetary carrier, and a third ring gear, respectively, and the tenth, eleventh, and twelfth rotation elements of the fourth planetary gear set are a fourth sun gear, a fourth planetary carrier, and a fourth ring gear, respectively.

10. The planetary gear train of claim 6, wherein the first, second, third, and fourth planetary gear sets are disposed in order of the first, second, third, and fourth planetary gear sets from an engine side.

* * * * *